US012774943B2

(12) United States Patent
Blagojevic et al.

(10) Patent No.: US 12,774,943 B2
(45) Date of Patent: Oct. 27, 2026

(54) SAMPLING FOR MOLECULAR ROTATIONAL RESONANCE SPECTROSCOPY

(71) Applicant: BrightSpec, Inc., Charlottesville, VA (US)

(72) Inventors: Voislav Blagojevic, Charlottesville, VA (US); Chris Thompson, Lunenburg, MA (US); Justin L. Neill, Charlottesville, VA (US)

(73) Assignee: BrightSpec, Inc., Charlottesville, VA (US)

( * ) Notice: Subject to any disclaimer, the term of this patent is extended or adjusted under 35 U.S.C. 154(b) by 291 days.

(21) Appl. No.: 18/514,320

(22) Filed: Nov. 20, 2023

(65) Prior Publication Data

US 2024/0085286 A1 Mar. 14, 2024

Related U.S. Application Data

(63) Continuation of application No. PCT/US2022/030181, filed on May 20, 2022.
(Continued)

(51) Int. Cl.
*G01N 1/40* (2006.01)
*G01N 1/02* (2006.01)
(Continued)

(52) U.S. Cl.
CPC ............. *G01N 1/4022* (2013.01); *G01N 1/02* (2013.01); *G01N 30/7246* (2013.01);
(Continued)

(58) Field of Classification Search
CPC .. G01N 1/4022; G01N 1/02; G01N 2001/028; G01N 2001/4027;
(Continued)

(56) References Cited

U.S. PATENT DOCUMENTS 5,454,274 A 10/1995 Zhu
7,619,217 B2 11/2009 Shea et al.
(Continued)

FOREIGN PATENT DOCUMENTS

CN 104254772 A 12/2014
CN 106513232 A 3/2017
(Continued)

OTHER PUBLICATIONS

Extended European Search Report in European App. No. 22805543.0 mailed Mar. 24, 2025, 19 pages.
(Continued)

*Primary Examiner* — Georgia Y Epps
*Assistant Examiner* — Hanway Chang
(74) *Attorney, Agent, or Firm* — Smith Baluch LLP

(57) ABSTRACT

Molecular rotational resonance (MRR) spectroscopy can be used to characterize neutral, gas-phase molecules with very fine spectral resolution. Typically, the analyte molecules are placed in solution, which is heated initially to evaporate the solvent, then heated more to volatilize the analyte. Unfortunately, this approach does not always work well for analytes with low volatilities or susceptibility to thermal degradation. These analytes can be volatilized instead using laser-induced acoustic desorption (LIAD), flash vaporization, or nebulization. In LIAD, the analyte is dried onto a metal foil, which is illuminated by a laser. The laser beam generates an acoustic wave in the metal foil that shakes off the analyte. In flash vaporization, a small amount of liquid analyte drips onto a very hot surface, where it vaporizes too quickly to degrade. And in nebulization, a nebulizer pumps a fine spray of analyte into a heated transfer tube, where the solvent evaporates.

20 Claims, 10 Drawing Sheets

Related U.S. Application Data

(60) Provisional application No. 63/191,560, filed on May 21, 2021.

(51) Int. Cl.

| | |
|---|---|
| ***G01N 30/72*** | (2006.01) |
| ***G01N 30/86*** | (2006.01) |
| ***H01J 49/16*** | (2006.01) |

(52) U.S. Cl.

CPC ......... *G01N 30/7253* (2013.01); *G01N 30/86* (2013.01); *G01N 2001/028* (2013.01); *G01N 2001/4027* (2013.01); *H01J 49/165* (2013.01)

(58) Field of Classification Search

CPC ........... G01N 30/7246; G01N 30/7253; G01N 30/86; H01J 49/165

See application file for complete search history.

(56) References Cited

U.S. PATENT DOCUMENTS

| | | | |
|---|---|---|---|
| 7,645,987 | B2 | 1/2010 | Chang et al. |
| 8,344,319 | B2 | 1/2013 | Kenttamaa et al. |
| 2007/0295902 | A1 | 12/2007 | Shea et al. |
| 2008/0308722 | A1 | 12/2008 | Shiea |
| 2012/0090465 | A1 | 4/2012 | Winter |
| 2012/0325925 | A1 | 12/2012 | Ivaldi et al. |
| 2013/0210162 | A1 | 8/2013 | Nyadong et al. |
| 2014/0116111 | A1 | 5/2014 | Taneda et al. |
| 2014/0305230 | A1 | 10/2014 | Borton et al. |
| 2015/0077137 | A1 | 3/2015 | Patterson et al. |

FOREIGN PATENT DOCUMENTS

| | | | |
|---|---|---|---|
| WO | 2020068280 | A1 | 4/2020 |
| WO | 2020227541 | A1 | 11/2020 |

OTHER PUBLICATIONS

Dow et al., "Laser-induced acoustic desorption mass spectrometry." European Journal of Mass Spectrometry 18.2 (2012): 77-92.

International Search Report and Written Opinion in International Application No. PCT/US2022/030181 mailed Sep. 23, 2022, 17 pages.

Ma et al., "Laser-induced acoustic desorption." MRS Bulletin 44.5 (2019): 372-381.

Chinese Office Action with Search Report (with translation) in Chinese App. No. 202280049576X dated Aug. 7, 2026, 21 pages.

Legend
100 — LIAD Sampling Interface
101 — Sample Foil
102 — Moving Stage
103 — Enclosure
106 — Carrier Gas Port
107 — Laser
108 — Window
120 — Gas Flow Direction
1000 — MRR Instrument
1006 — MRR Nozzle

200

Legend
200 – LIAD Sampling Interface
201 – Sample Foil
202 – Foil Holder
203 – Enclosure
206 – Neon Gas Port
207 – Laser
208 – Moving Stage
209 – Optical Waveguide
220 – Gas Flow Direction
1000 – MRR Instrument
1006 – MRR Nozzle Legend 300 – Flash Evaporation Sampling Interface 301 – Gas Outlet 303 – Capillary Tube 304 – Sealing Ferrule 305 – Gas-tight Tee 306 – Neon Gas Port 307 – Heating Block 308 – Flash Evaporation Point 320 – Gas Flow Direction 321 – Heated Transfer Tube 1000 – MRR Interface 1006 – MRR Nozzle Legend
400 – Flash Evaporation Sampling Interface
401 – Sample Plate
402 – Enclosure
405 – Heated Transfer Line
406 – Neon Gas Port
420 – Gas Flow Direction
1000 – MRR Instrument
1006 – MRR Nozzle Legend
501 – Sample Capillary Tube
502 – Pneumatic Nozzle
503 – Enclosure
506 – Nebulizer Gas Tee Junction
507 – Nebulizer Gas Inlet
508 – Gas-tight Seal
520 – Gas Flow Direction
521 – Heated Transfer Tube
1000 – MRR Interface
1006 – MRR Nozzle Legend
701 – Ultrasonic Nebulizer Body
702 – Ultrasonic Nozzle
703 – Connecting Flange
704 – Gas Capillary
705 – Gas Inlet
706 – Liquid Flow Channel
707 – Liquid Inlet
708 – Union Legend 801 – Ultrasonic Device
802 – Ultrasonic Mesh Surface
803 – Enclosure
806 – Heated Transfer Line
807 – Primary Neon Gas Inlet
808 – Auxiliary Neon Gas Inlet
809 – Liquid Pump
810 – Liquid Transfer Line
811 – Nebulizer Power Supply
820 – Gas Flow Direction
1000 – MRR Interface
1006 – MRR Nozzle Legend 901 – Vaporization Solution
902 – Carrier Gas Inlet
903 – Liquid Pump
904 – Liquid Transfer Line
905 – Molecular Sieve Column
920 – Gas Flow Direction
1000 – MRR Instrument
1006 – MRR Instrument Nozzle

FIG. 10

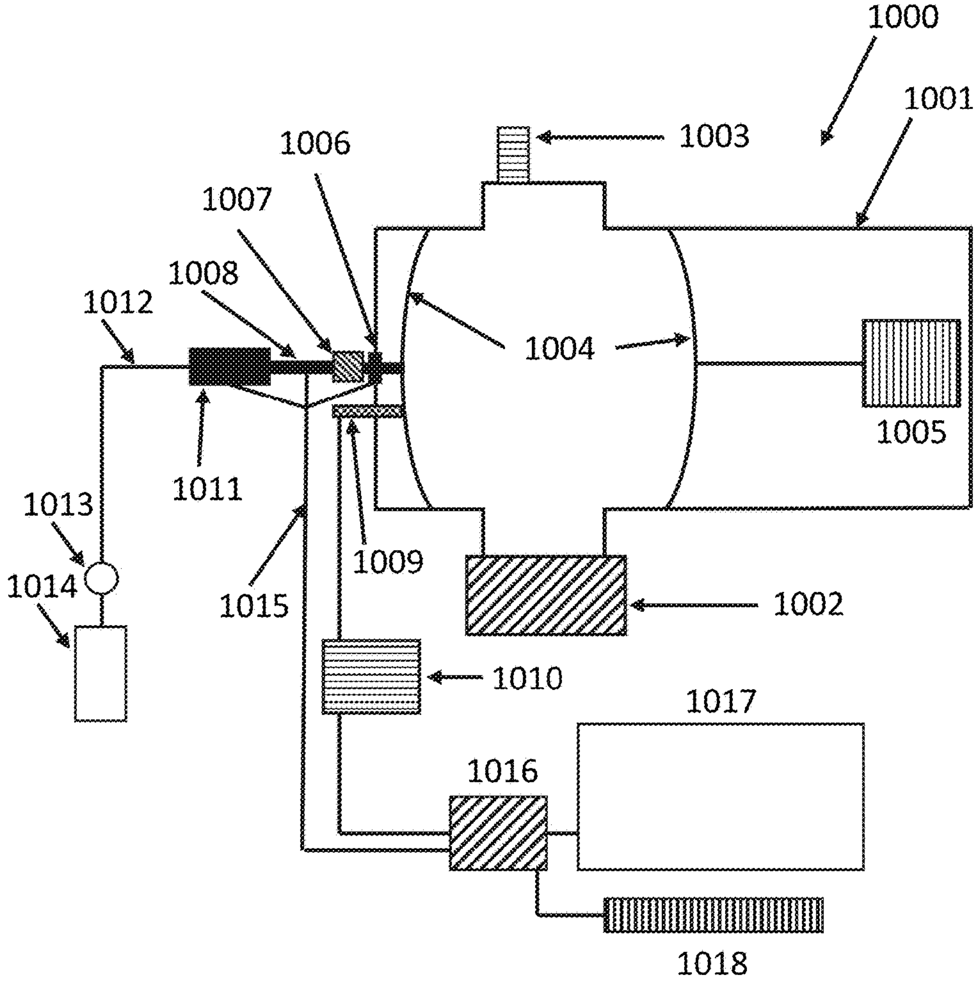

Legend

1000 – MRR Instrument
1001 – Vacuum Chamber
1002 – Vacuum Pump
1003 – Pressure Monitor
1004 – Aluminum Mirrors
1005 – Translation Stage
1006 – MRR Instrument Nozzle
1007 – Pulse Valve
1008 – Gas Transfer Line
1009 – Microwave Antenna Module
1010 – Microwave Generation and Detection
1011 – Modular Sampling Interface
1012 – Carrier Gas Line
1013 – Gas Flow and Pressure Regulator
1014 – Carrier Gas Cylinder
1015 – Heater and Thermal Sensor Bundle (3 heaters and temperature measurement points)
1016 – Control Computer
1017 – Computer Display
1018 – Computer Input Device (keyboard, mouse)

SAMPLING FOR MOLECULAR ROTATIONAL RESONANCE SPECTROSCOPY

CROSS-REFERENCE TO RELATED APPLICATION(S)

The present application is a bypass continuation of International Application No. PCT/US2022/030181, filed on May 20, 2022, which claims the priority benefit, under 35 U.S.C. 119(e), of U.S. Application No. 63/191,560, filed on May 21, 2021. Each of these applications is incorporated herein by reference in its entirety.

BACKGROUND

Molecular rotational resonance (MRR) spectroscopy identifies molecules based on their fingerprint spectra in the microwave-to-millimeter wave region of the spectrum (1-40 GHz for the microwave region and 30-3000 GHz for the millimeter region). The distinctive spectra for different compounds arise from radiation interacting with the end-over-end rotations of different molecules in a low-pressure (e.g., less than 100 mTorr) gas-phase environment. The pattern of each spectrum correlates very precisely with the three-dimensional structure of the molecule, so any modification to the structure of the molecule changes this pattern and allows for differentiation of molecules based on their structures. The extremely high resolution of the MRR spectroscopy means that the patterns (spectra) of different compounds can be resolved directly in a mixture without being separated. Additionally, the structure of the pattern depends only on the three-dimensional structure (mass distribution and electronic charge distribution) of the molecule, which can be calculated accurately and efficiently by commercially available quantum chemistry software. Therefore, compounds can be identified directly in a complex mixture without the need for pure reference standards, which can be very expensive and difficult to produce.

MRR spectroscopy characterizes compounds through their pure rotational angular momentum transitions in the gas phase. Rotational energy levels of a molecule are quantized according to the molecule's three-dimensional mass distribution. This mass distribution also determines the molecule's moment of inertia (I). The moment of inertia can be described with a simple formula, $I=\Sigma m_i r_i^2$, where $m_i$ is the mass of atom i in the molecule and $r_i$ is the distance of atom i from the molecule's center of mass. Molecules can be distinguished through their principal moments of inertia in the three spatial axes. The molecule's rotational spectra can be described by a Hamiltonian that depends on the molecule's moments of inertia. Rotational spectra typically contain numerous and extremely narrow transition lines, providing a unique fingerprint of molecular structure that can be used to identify the molecule.

Some MRR spectrometers are investigative, high-flexibility instruments for measuring broadband spectra—that is, they can characterize all the analytes in a sample, including those that are unknown or unanticipated. This is very useful in an analytical lab setting, where comprehensive analyses are desired. Other MRR spectrometers are designed to measure targeted spectra—focusing on the known resonances of specific analytes in each sample. This reduces the cost of the waveform generation and detection dramatically, while preserving the molecular specificity of the technique. Targeted analyses can also be more sensitive (e.g., by a factor of 10-to-100) than broadband analyses in the same amount of time due to the focusing of excitation power over smaller frequency ranges, enabling useful measurements to be taken more rapidly.

SUMMARY

MRR spectroscopy acquires spectra of neutral, gas-phase analytes. Analytes are isolated, free of solvent and free of other associated molecules. To acquire spectra of liquid or solid analytes, the analytes are first volatilized. Typically, volatilization is performed by heating the analyte to its boiling point to translate the molecules from the liquid or solid phase to the gas phase. For example, a typical method of analyzing an analyte in solution includes extracting the analyte using heat. First, the analyte solution is transferred into a reservoir and heated to a first temperature to evaporate the solvent from the solution. Then, the reservoir is heated to a second temperature, higher than the first temperature, to volatilize the analyte. The analyte is then transferred from the reservoir to a nozzle that is thermally isolated from the reservoir. The nozzle injects the volatilized analyte into a vacuum chamber, where a MRR spectrum of the analyte is measured.

The inventors have recognized that current methods of sampling liquid and solid analytes for MRR spectroscopy have challenges. One challenge is the difficulty in volatilizing analytes with high molecular weights (e.g., analytes whose molecular weights are greater than 100 Daltons) and low volatility (e.g., a boiling point greater than 100° C.). To volatilize analytes with these properties, the analytes may be heated to high temperatures. Another challenge is the temperature stability of analytes. Heating an analyte with low temperature stability may cause thermal degradation of the analyte. Many compounds cannot be volatilized by heating to a boiling point because they thermally decompose prior to vaporization. Analytes with both low volatility and low temperature stability are difficult to volatilize for MRR spectroscopy.

The inventors have recognized that alternative means of vaporization are needed so that certain compounds can be successfully analyzed with MRR spectroscopy. The inventors have developed several low-volatility sampling methods and interfaces that can volatilize analytes with low volatility and/or low temperature stability to introduce molecular samples into a MRR spectroscopy instrument for molecular analysis. These sampling methods and interfaces volatilize analytes with little to no thermal degradation.

A sampling interface for an MRR spectrometer can include an enclosure, a heating element disposed within the enclosure, a carrier gas port coupled to the enclosure, and a nozzle in fluid communication with the enclosure. The heating element has a surface that can reach a temperature at least 100° C. higher than a boiling point of an analyte and, when at that temperature, vaporizes analyze. The carrier gas port flows a carrier gas into the enclosure, causing the analyte to be entrained in the carrier gas. And the nozzle vents the analyte and the carrier gas into a sample chamber of the MRR spectrometer.

The sampling interface may also include a sample port, in fluid communication with the surface of the heating element, to convey a solution containing the analyte to the surface of the heating block, the surface of the heating block vaporizing the analyte. In this case, the sampling interface may also include a molecular sieve, in fluid communication with the nozzle, to remove vaporized solvent. Alternatively, the analyte can be a solid analyte deposited on a sample plate in thermal communication with the surface of the heating element.

An analyte can be introduced into an MRR spectrometer by heating an evaporation surface to a temperature at least 100° C. higher than a boiling point of the analyte. The analyte is disposed on the evaporation surface, which vaporizes the analyte, which is then entrained in a carrier gas and vented into a sample chamber of the MRR spectrometer with the carrier gas. A molecular sieve can remove vaporized solvent from the analyte and the carrier gas before the analyte and the carrier gas are vented into the MRR spectrometer's sample chamber.

Another sampling interface may include an enclosure, a nebulizer coupled to the enclosure, and a nozzle in fluid communication with the enclosure. The nebulizer produces a fine mist of an analyte in the enclosure. The fine mist comprises droplets with volumes of about 1 μL to about 10 μL. And the nozzle vents the fine mist of the analyte into a sample chamber of the MRR spectrometer.

The nebulizer can be a pneumatic nebulizer comprising a pneumatic nozzle having a first orifice with a first diameter, a second orifice with a second diameter greater than the first diameter, and a lumen connecting the first orifice and the second orifice. The first orifice is disposed within the enclosure. The pneumatic nebulizer also includes a carrier gas port, coupled to the second orifice of the pneumatic nozzle, that introduces a carrier gas into the enclosure via the pneumatic nozzle.

Alternatively, the nebulizer can be an ultrasonic nebulizer comprising a vibrating device, such a piezoelectric transducer, and a flow channel, partially disposed within the vibrating device, to convey the analyte to a surface of the vibrating device. The nebulizer can also be an ultrasonic nebulizer comprising a vibrating device, such as a piezoelectric device, having a surface disposed within the enclosure and a tube to convey the analyte to the surface of the vibrating device.

Liquid analyte can be introduced into an MRR spectrometer by nebulizing the liquid analyte to produce a fine mist of the analyte and venting the fine mist into a sample chamber of the MRR spectrometer.

Yet another sampling interface may include an enclosure, a metal foil in the enclosure, a laser, a carrier gas port, and a nozzle. The metal foil has a first surface that supports an analyte and a second surface that is illuminated by a laser beam from the laser. The laser beam produces an acoustic wave in the metal foil that causes desorption of the analyte from the first surface of the metal foil. The carrier gas port flows a carrier gas into the enclosure, and the nozzle vents the (neutral) analyte and the carrier gas into a sample chamber of the MRR spectrometer.

Analyte can be introduced into an MRR spectrometer by disposing the analyte on a first surface of a metal foil and illuminating a second surface of the metal foil opposite the first surface with a laser beam. The laser beam produces an acoustic wave in the metal foil that causes desorption of the analyte from the first surface of the metal foil. The analyte is entrained in a carrier gas and vented into a sample chamber of the MRR spectrometer. The analyte may not be ionized before being vented into the sample chamber of the MRR spectrometer.

For each sampling interface, the enclosure can be kept at a pressure of about 3 bar to about 15 bar. The enclosure can contain a mixture of gases, with at least 75% of the mixture of gases is the carrier gas.

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally and/or structurally similar elements).

FIG. 10 shows an MRR instrument with a sampling interface (e.g., a LIAD, flash evaporation, or nebulization sampling interface) that volatilizes analytes with high molecular weights and low volatilities and injects them into the MRR instrument's sample chamber.

DETAILED DESCRIPTION

Figure 1:
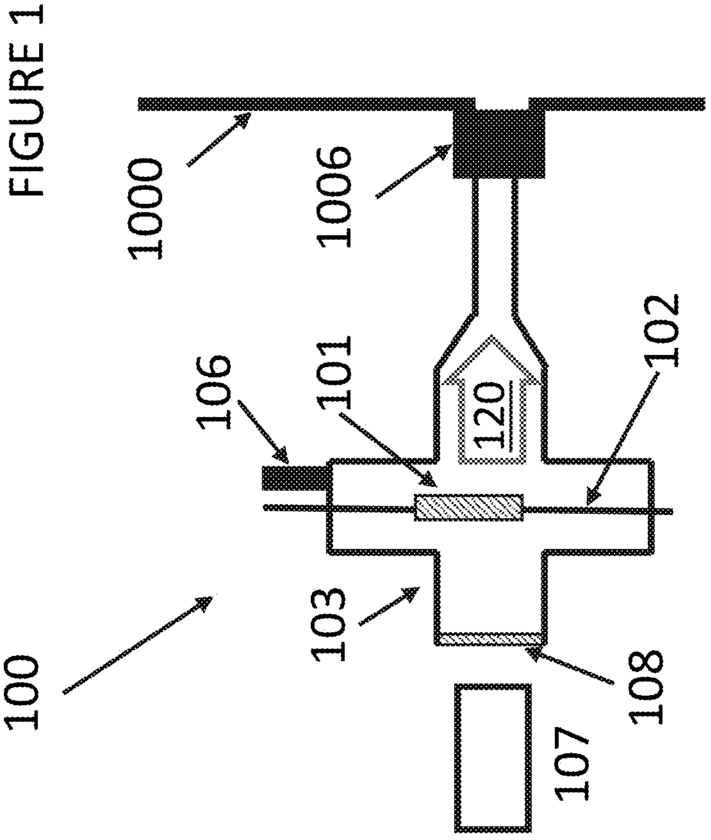
FIG. 1 shows a laser-induced acoustic desorption (LIAD) sampling interface for a molecular rotational resonance (MRR) instrument with a moving foil.

Molecular rotational resonance (MRR) spectroscopy can be used to monitor reactions for completion, product yield, intermediates, and impurities including isomers (enantiomers, diastereomers, and/or regioisomers). Its impact arises from the new chemical insights (e.g., resolution and specificity), measurements yield, and speed with which it can generate results. The new chemical insights mean a greater ability to understand why a chemical process worked or did not work as intended, and the speed can advance the larger objective of continuous manufacturing within the pharmaceutical industry.

Unlike other techniques for analytical chemistry, MRR spectroscopy can be used to quickly identify and quantify individual components in complex mixtures, including isomeric impurities that are often very difficult or impossible to resolve by other techniques. MRR spectroscopy's advantages make it especially suitable for analyzing volatile chemicals in a pharmaceutical research and development lab. Because MRR spectroscopy works by analyzing molecules in the low-pressure gas phase, the volatile chemicals are volatilized, or changed from solutions or solids into the gas phase for measurement.

Volatilizing samples for MRR analysis can be challenging, especially when the samples have low volatility (e.g., samples with boiling points above 200° C.) and are temperature sensitive (subject to thermal degradation). Fortunately, the inventive sampling interfaces can reliably and reproducibly introduce condensed-phase samples into rotational spectroscopy instruments without causing substantial thermal decomposition. The low-volatility sampling interfaces volatilize one or more analytes, such as an active pharmaceutical ingredient (API), API precursor, API intermediate, or API reaction byproduct, in a liquid solution or solid-state film for measurement using MRR spectroscopy. The low-volatility sampling interfaces may volatilize analytes into a carrier gas stream. For small amounts of analyte (e.g., samples with masses below 5 mg), the sampling interface can volatilize the analyte in about 30 minutes or less (e.g., 30 seconds, 1 minute, 5 minutes, 15 minutes) with typical volatilization rates from 10 μg $min^{-1}$ to 100 μg $min^{-1}$. For large amounts of analyte (e.g., a large, heated reservoir of analyte), the sampling interface can volatilize the analyze over a period of up to 24 hours. The vaporized analyte is entrained into the carrier gas, which is injected through a nozzle into a vacuum sample chamber for MRR analysis.

The inventive sampling techniques and interfaces for MRR disclosed herein include laser-induced acoustic desorption (LIAD), flash vaporization, pneumatic nebulization, and ultrasonic nebulization. These sampling techniques and interfaces may be used to provide a volatilized sample for MRR analysis. The sampling techniques and interfaces may be controlled using a computer control system that also controls the MRR instrument and analyzes MRR data.

An MRR Instrument with a Modular Sampling Interface

FIG. 10 shows an MRR instrument 1000 with a modular sampling interface 1011, also called a sample vaporization module, that volatilize analytes with high molecular weights and low volatilities for MRR analysis. The MRR instrument 1000 includes a vacuum chamber 1001, also called a sample chamber, that is pumped down to vacuum pressure by a vacuum pump 1002. A pressure monitor 1003 coupled to the vacuum chamber 1001 monitors the pressure level inside the vacuum chamber 1001.

The vacuum chamber 1001 also holds aluminum mirrors 1004, a translation stage 1005, and a microwave antenna module 1009, which is coupled to microwave generation and detection circuitry 1010. In operation, the microwave antenna module 1009 emits a signal generated by the microwave generation and detection circuitry 1010 into a cavity formed between the mirrors 1004. The signal resonates within the cavity, whose resonance frequency can be tuned by moving one of the mirrors 1004 with the translation stage 1005. The signal causes any sample in the cavity to emit a free induction decay signal, which the microwave antenna module 1009 detects and couples to microwave generation and detection circuitry 1010 for analysis with a control computer 1016.

The sample enters the chamber via an MRR instrument nozzle 1006 from the sampling interface 1011 in a stream or flow of carrier gas. The carrier gas flow is supplied by a carrier gas cylinder 1014 or other source, with a gas flow and pressure regulator 1013 controlling the carrier gas flow to the sampling interface 1011 via a carrier gas line 1012. A gas transfer line 1008 carries the carrier gas flow and volatilized sample flow from the sampling interface 1011 to a pulse valve 1007, which passes pulses of volatized sample entrained in carrier gas to the MRR instrument nozzle 1006.

The MRR instrument 1000 is controlled by a control computer 1016, which in turn can be controlled by a user via a display 1017 or other output device and one or more input devices 1018, e.g., a keyboard, touch screen, or a mouse. The computer control system 1016 can be coupled to microprocessor control units in the valves, pumps, and/or heaters incorporated into the sampling interface 1011 and/or the MRR instrument 1000 via a wired (e.g., serial, USB, ethernet) or wireless interface (e.g., Bluetooth). For example, a heater in the sampling interface 1011 may be packaged with a thermocouple temperature sensor and a heater control unit in a bundle 1015 with a microprocessor operably coupled to the heating element and the thermocouple. The microprocessor may control the temperature by turning the heating element on and off while using thermocouple temperature readings in a sensor feedback loop. The heater control unit can be coupled with the computer control system via a USB interface and be controlled by the computer control system. The computer control system 1016 may provide a control interface through which the user can control the temperature of the heater. The computer control system 1016 can also regulate sampling operation according to the heater operation and/or temperature measured by the thermocouple. When a user requests sample analysis, the computer control system 1016 may delay analysis until the interface has reached the targeted temperature.

The sampling interface 1011 may include and/or be coupled to several sensors, including pressure sensors and temperature sensors. Each heater incorporated into the sampling interface 1011 or MRR instrument 1000 can include a thermocouple sensor thermally coupled to a corresponding heating element and coupled to the computer control system 1016. A user monitors and controls system parameters using a user interface 1017 that displays sensor data from the sensors incorporated into the system.

The sampling interfaces may be configured as modular units that can be detachably coupled to the MRR instrument. In this way, the sampling interface modules can be easily swapped by the user depending on the user's preference. The user simply detaches one sampling interface module 1011 and attaches another. Each modular unit 1011 may include an identification chip that communicates with the computer control system, for example, a radio-frequency identification (RFID) chip detected by a reader placed on or near the instrument 1000, or a small chip providing specific electric voltage over a designated connector that connects to the receptacle on the instrument 1000 when the sampling interface 1011 is installed. The computer control system 1016 may identify the sampling interface 1011 coupled to the MRR instrument 1000 and tailor the mode of operation depending on the type of sampling interface 1011.

For example, the thermal vaporization by a Programmable Temperature Vaporizing (PTV) sampling interface does not control the sample introduction rate. It injects a fixed amount of sample at the start of the experiment and monitors analyte evolution over time. So, quantitative analysis involves integration of the full analyte intensity vs. time curve, which is automatically performed by the instrument software. On the other hand, a flash evaporation sampling interface injects sample at a controlled rate, so quantitative analysis can be done directly from analyte intensity without integration. By identifying the type of sampling interface, the instrument software can use the appropriate quantification routine and perform the experiment in a way suitable for that routine. In some embodiments, the same MRR nozzle 1006 may be used across different sampling interface modules 1011. In other embodiments, different MRR nozzles are used with different sampling interface modules 1011. For example, a sampling interface that operates at high temperature (e.g., above 250° C.) may use a larger diameter nozzle to achieve desired gas flow rate due to increase in kinematic gas viscosity.

Each of these sampling interfaces may include an enclosure coupled to the MRR instrument, in which one or more analytes in a sample are volatilized prior to injection into the MRR instrument. The enclosure is maintained at a pressure greater than atmospheric pressure (e.g., 3 bar to 15 bar). The gas mixture in the MRR nozzle 1006 has a carrier gas content with a mole percent of 75% or greater. The upper limit of carrier gas content mole percent may be very close to 100% and may depend on the amount of vaporized sample for successful detection as the sum of analyte and carrier gas adds up to 100%. For example, if a successful detection can be achieved with sample abundance of 0.01% in carrier gas, the carrier gas content may be up to 99.99% (100%-0.01%). If instrument sensitivity is improved and successful detection can be achieved from sample abundance of 0.001% in carrier gas, the carrier gas content may be 99.999% (100%-0.001%). Carrier gas flow ranges from 20 mL/min to 150 mL/min at pressure between 3 psi and 15 psi.

The carrier gas pressure is controlled by the gas pressure regulator 1013 attached to the high-pressure gas storage tank 1014. The flow rate is monitored by a flow rotameter fluidly coupled to the gas regulator 1013. An upper limit of the flow rate is determined based on the frequency and pulse duration of the MRR nozzle 1006 at a given pressure. For example, a valve pulse frequency of 10 Hz and pulse duration of 1 ms may produce an average gas flow rate of 50 mL/min, while increasing the pulse duration to 2 ms may increase the flow rate to 80 mL/min. Typical pulse valve frequencies are 5 Hz to 10 Hz and pulse durations range from 0.7 ms to 5 ms. A heater and thermocouple may be thermally coupled to the MRR nozzle 1006 and operably coupled to the computer control system 1016.

Laser-Induced Acoustic Desorption (LIAD)

LIAD is used to introduce molecular samples into an MRR spectroscopy instrument for molecular analysis. LIAD is a vaporization technique that utilizes laser-generated acoustic waves to vaporize a sample without exposing the sample to elevated temperatures. The sample is deposited on a front side of a thin metal foil. Laser pulses illuminate the back side of the metal foil, creating acoustic waves that propagate in and along the foil. The acoustic waves vibrate the front surface of the foil, causing desorption of the dried analyte from the front surface. In other words, the laser-induced acoustic waves shake the dried analyte off the front surface of the foil and into the enclosure. A carrier gas flow blows the desorbed analyte from the enclosure into the MRR sample chamber. Suitable carrier gases for MRR include neon, argon, and nitrogen.

The thickness of the metal foil changes the sample vaporization efficiency. Thinner foils permit a higher amplitude acoustic vibration but may also have more thermal heating. Thicker foils may prevent substantial thermal heating but may undergo less acoustic vibration. The metal foil may be about 10 μm thick to about 13 μm thick, e.g., 12.5 μm thick. The sample may be deposited as a solid or as a (liquid) solution and dried to remove any solvents prior to vaporization. The sample may be dried at room temperature or at an elevated temperature, depending on the thermal sensitivity of the sample. The back side of the foil may be mounted to a transparent glass or gel surface to reduce or prevent pitting of the foil during LIAD.

The back side of the foil can be illuminated with pulses from a Nd:YAG laser emitting at wavelength of 532 nm with a pulse duration of 3 nanoseconds. For example, the laser may emit pulses at a pulse repetition rate of 10 Hz, spot size from 0.5-3 mm in diameter, and energy of 25 MJ per pulse. These pulses produce acoustic waves that propagate through the foil to the front surface of the foil. The pulse wavelength, pulse power, pulse duration, pulse repetition frequency, and foil thickness are selected to avoid or minimize thermal heating of the sample through absorption of the laser light by the foil, thus avoiding or reducing thermal degradation of heat-sensitive analytes. These parameters can be tuned experimentally using a mass spectrometer, with the mass spectrometer concurrently measuring (1) the analyte ion signal to gauge sample emission intensity and (2) any thermal degradation products, which have different mass/charge ratios.

LIAD has been used with mass spectrometry, which works with ionized samples. For mass spectrometry, LIAD may be used to volatilize a neutral solid sample, thereby transferring it into the gas phase. But LIAD lacks the ability to ionize the sample. Therefore, for mass spectrometry, LIAD is paired with another method that ionizes the sample after LIAD transfers the sample into the gas phase. This approach has several drawbacks, including a more complicated sampling interface and using additional steps. Ionizing volatilized samples after they have been transferred into the gas phase can be more difficult than ionizing during the process of volatilization. Furthermore, the ionization process can degrade the sample. LIAD has not been widely adopted for mass spectrometry because it is generally easier to ionize the sample during vaporization, for example, by using a combination of pneumatic nebulization and a strong electric field (i.e., electrospray ionization) or combination of a small conductive capillary and a strong electric field (i.e., nanospray ionization), than after vaporization. Both electrospray ionization and nanospray ionization are widely adopted for mass spectrometric analysis of a wide variety of samples.

Unlike mass spectrometry, MRR spectroscopy uses neutral samples, so samples are not ionized prior to introduction into the MRR instrument. Therefore, LIAD can prepare a neutral sample for MRR measurement in a single step (i.e., without ionization), making LIAD very attractive for volatilizing samples for MRR analysis. Nevertheless, combining LIAD with MRR spectroscopy presents some unique challenges. Some of these challenges are related to MRR's specific operating conditions with regard to sample introduction and gas composition. One challenge is controlling the composition of the gas introduced into the MRR nozzle. This challenge is addressed by varying the sample introduction rate. The sample introduction rate depends on the sample deposition thickness, laser movement speed, and carrier gas flow rate, which should be high enough to ensure excess carrier gas. The enclosure can also be sealed to prevent air intrusion.

Another challenge with using LIAD for MRR spectroscopy is the vaporization efficiency, which is defined as the fraction of the vaporized analyte that is released as individual molecules, rather than molecular clusters and particulates. MRR spectroscopy measures spectra of free individual molecules, so analyte vaporization that predominantly creates molecular clusters and particles does not allow spectral measurement. The higher measurement sensitivity of mass spectrometry allows measurement with LIAD vaporization efficiencies as low as 0.001%. In contrast, MRR works better with LIAD vaporization efficiencies of at least 1%, and preferably more than 20%. Without high LIAD vaporization efficiency, MRR operation could consume an unreasonably large amount of sample (on the order of grams).

The vaporization efficiency of LIAD is influenced by several factors, including laser intensity, sample thickness on the foil, and physical and chemical properties of the analyte. Under optimum conditions, sample vaporization can be achieved with a single laser pulse, so the laser should have sufficient power density (e.g., 3 MJ $mm^{-2}$ per laser shot). Lower power lasers may be focused to achieve the desired power density, reducing the vaporization area. The thickness of the sample layer on the foil strongly influences vaporization efficiency, so the sample should be deposited as a uniform layer of specific thickness. The sample thickness and uniformity can be controlled precisely by using an ultrasonic nebulizer for sample deposition. Controlling the movement speed of the ultrasonic device across the foil, the liquid flow rate, and concentration of the analyte solution can produce uniform sample layer with predictable and reproducible thickness. The optimum sample thickness may depend on intermolecular binding in the analyte; for example, crystalline analytes, which typically have stronger intermolecular binding, vaporize less efficiently than powdered analytes, which typically have weaker intermolecular binding. Thus, a crystalline analyte should be deposited in a thinner layer (e.g., less than 5 μg $mm^{-2}$) than a powdered analyte (5-30 μg $mm^{-2}$) and illuminated with a faster scanning laser beam to produce the same analyte flux.

Figure 2:
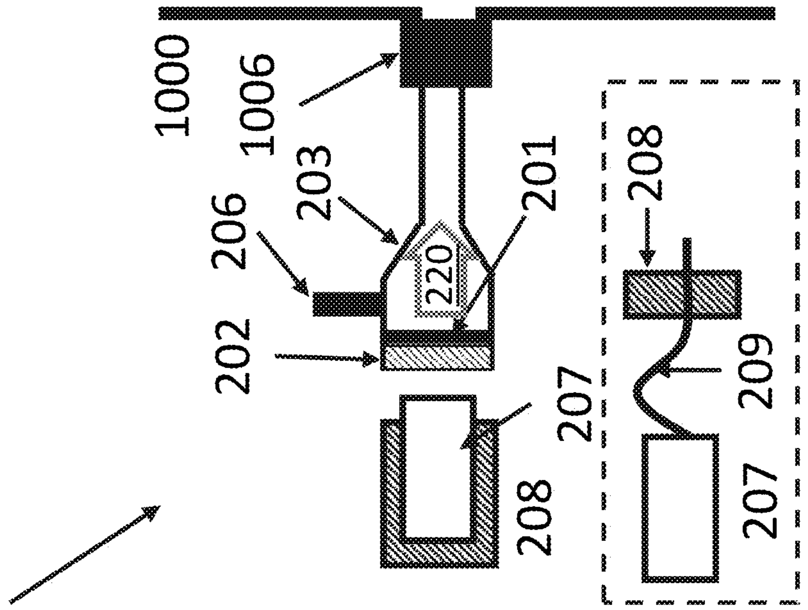
FIG. 2 shows a LIAD source sampling interface with a moving laser beam.

FIGS. 1 and 2 show different LIAD sampling interfaces 100 and 200, respectively, each of which is coupled to the MRR instrument 1000 of FIG. 10. FIG. 1 shows a LIAD sampling interface 100 with a sample foil 101 that is mounted on a moving translation stage 102. Dried sample analyte is disposed on the side of the sample foil 101 facing away from a laser 107. The sample foil 101 and stage 102 are disposed within an enclosure 103 that is connected to the MRR nozzle 1006 on the MRR instrument 1000. Carrier gas, e.g., neon, is delivered into the enclosure through a gas port 106. The laser 107 emits a laser beam directly toward the side of the sample foil 101 opposite the side with the sample. The laser beam enters the enclosure 103 through a laser-transparent window 108 and generates an acoustic wave in or on the sample foil 101, vaporizing at least a portion of the analyte dried onto the sample foil 101.

The sample vaporized by the acoustic desorption mixes with the (neon) carrier gas in the enclosure 103 and is carried into the MRR nozzle 1006 by the flow of the carrier gas. Moving the stage 102 shifts the position of the sample foil 101 with respect to the laser 107, providing fresh sample for vaporization to sustain LIAD operation for several minutes. The LIAD sampling interface 100 shown in FIG. 1 has been used to vaporize Ambroxide (boiling point 274° C.) and L-alanine (melting point 297° C., decomposes after melting) successfully.

FIG. 2 shows a LIAD sampling interface 200 with a moving laser beam and a fixed sample (and foil). Again, the LIAD sampling interface 200 includes a metal sample foil 201 with analyte disposed on one side. A sample holder 202 holds the sample foil 201 in a fixed position in an enclosure 203 with analyte-coated side of the sample foil 201 facing a laser-transparent window in the enclosure 203. The sample foil 201 and holder 202 are disposed within an enclosure 203 that is connected to the MRR nozzle 204 and MRR instrument interface 205. Carrier gas (e.g., neon) is supplied by a gas port 206 into the enclosure 203. A laser 207 is mounted on a moving stage 208, which moves the laser 207 transversely, sweeping laser's output beam across one surface to the sample foil 201. Alternatively, the laser 207 can be connected to an optical waveguide 209, whose end is fixed on the moving stage 208, or may illuminate a scanning mirror or other beam-scanning device that sweeps the laser beam across the sample foil 201. Moving the laser beam instead of the sample foil 201 significantly reduces the size of the enclosure 203, increasing the concentration of vaporized analyte.

In the LIAD sampling interfaces 100 and 200 in FIGS. 1 and 2, respectively, MRR operation typically involves a carrier gas, such as neon. The carrier gas content at the MRR nozzle typically exceeds 75%. To achieve this carrier gas content, the LIAD enclosure 103, 203 and the interface with the MRR instrument 1000 are isolated from ambient air. Air is purged from the enclosure 103, 203 prior to operation. The enclosure 103, 203 may be at a pressure above ambient pressure to facilitate optimum gas flow—with the entrained vaporized analyte—from the enclosure into the MRR instrument's vacuum chamber and proper operation of the MRR instrument interface (pulse valve and nozzle).

The suction force of the MRR instrument vacuum within the enclosure may be sufficient to direct the vaporized molecules into the MRR nozzle. In this case, the carrier gas (e.g., neon) may be supplied to the enclosure via a gas port. Some vaporized sample molecules may have enough velocity coming off the sample holder to overcome the suction force of the MRR instrument vacuum and to deposit on the walls of the enclosure. Enclosure may be heated to a temperature exceeding melting point of the analyte to prevent analyte accumulation on the walls.

The type of metal used to make the metal foil can be selected depending on the rate of analyte volatilization desired. Certain metals volatilize analytes at a faster rate, to create shorter, more intense sample emissions (e.g., titanium). Other metals volatilize analytes at a slower rate, to create longer less intense sample emissions (e.g., silver or gold). The type of metal may also be aluminum, copper, or iron.

Flash Vaporization

Flash vaporization completely vaporizes the sample so quickly that the sample experiences little to no thermal degradation. Flash vaporization uses an evaporation surface at a temperature of about 100° C. to about 150° C. above the boiling point of the analyte. For example, the evaporation surface may be an exposed surface of a heating block that is heated to a temperature between about 100° C. to about 700° C. If more than one analyte is present in a sample mixture, the temperature of the evaporation surface may be kept at a temperature at least 100° C. above the boiling point of the analyte in the sample mixture with the highest boiling point. The thermal mass of the heating block is large enough to ensure almost instantaneous vaporization. The thermal mass may be large enough to absorb at least part of the cooling effect of evaporation in order to reduce temperature oscillations (e.g., oscillations of less than 2%, 3%, or 5%) caused by dripping or spraying the liquid sample onto the evaporation surface. The mass of the heating block may be greater than 20 grams, e.g., about 30 grams.

Figure 3:
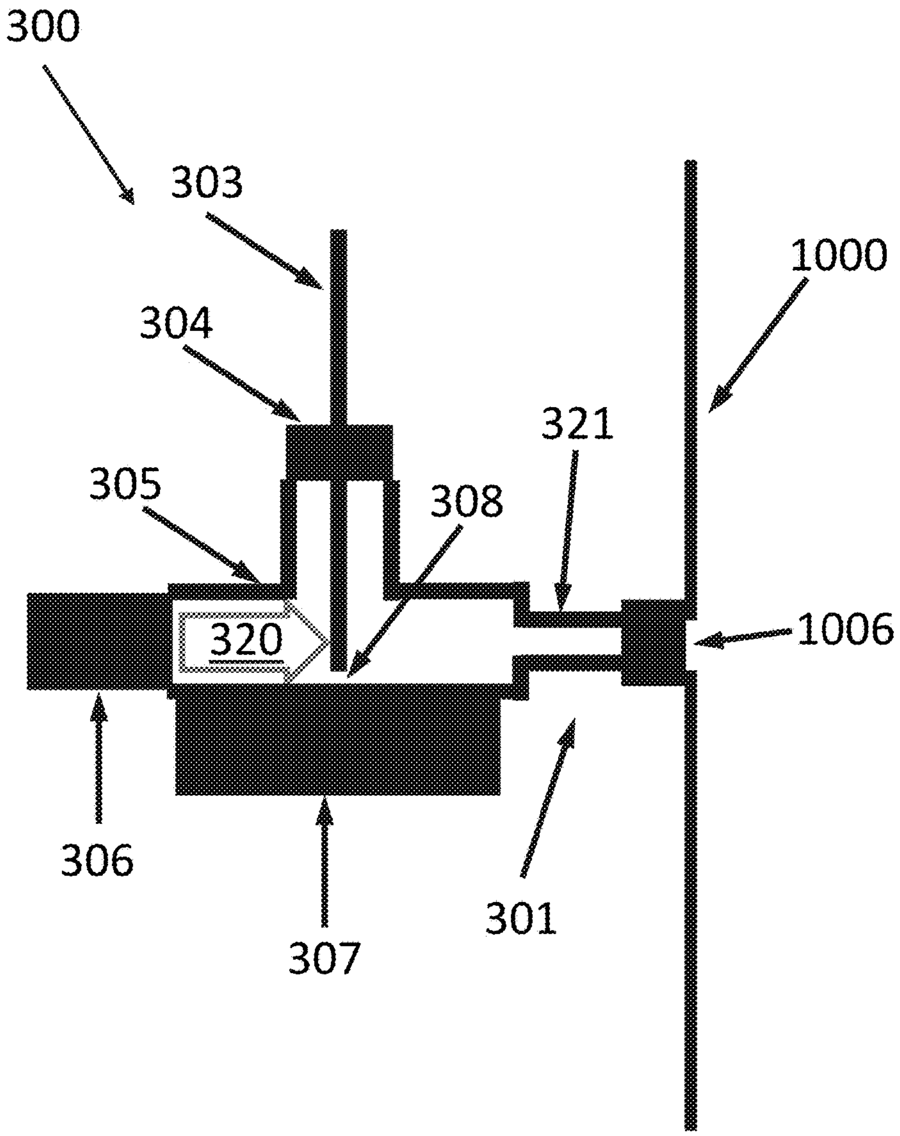
FIG. 3 shows a flash evaporation sampling interface for volatilizing liquid samples.

FIG. 3 shows a flash evaporation sampling interface 300 that is coupled to an MRR instrument 1000 and vaporizes liquid samples for MRR analysis. The flash evaporation sampling interface 300 operates at low analyte and/or solution flow rates (e.g., nL $min^{-1}$ to μL $min^{-1}$) and low neon gas flows (e.g., up to 1 L $min^{-1}$). The interface 300 may include a T-junction 305, with three ports used as a carrier gas (e.g., neon) inlet 306, a liquid sample inlet 304, and a gas outlet 301. The gas outlet 301 may be coupled to or form part or all of an MRR nozzle 1006 that connects to the MRR instrument's sample chamber. The carrier gas flow 320 may be directed through the apparatus at a flow rate of about 20 mL $min^{-1}$ to about 150 mL $min^{-1}$. Two gas ports 301 and 306 may be arranged on the opposite sides of the T-junction, with the liquid inlet port 304 between them.

The liquid sample inlet 304 may include a narrow, inert (metal or fused silica, for example) capillary tube 303 that is positioned above the evaporation surface of the heating block 307 with an opening directed toward or above the flash evaporation point 308. The capillary tube 303 may be placed in close proximity to the evaporation surface so that the liquid exiting the capillary tube 303 forms a liquid junction with the surface through capillary forces. The capillary volume may be reduced to increase the liquid velocity and prevent liquid heating and evaporation in the capillary tube 303. The heating block 307 may be a corrosion-resistance metal, such as grade 316 stainless steel. Alternatively, the sample can be introduced to the heated evaporation surface via a fused silica capillary or via capillary with a combination of corrosion-resistance metal and fused silica. For example, a fused silica capillary may be disposed inside of a metal capillary. In this example, carrier gas may be directed between the fused silica capillary and the metal capillary to provide cooling to the capillary and prevent sample backflow.

Operating the flash evaporation sampling interface 300 at constant temperature can cause reliability issues, such as capillary clogging. The close proximity of the capillary tube 303 to the heated surface can lead to solvent evaporation and analyte precipitation at the tip of the capillary tube 303. These problems may be alleviated by heating the evaporation surface intermittently using a high-density heater (e.g., 100-300 W $cm^2$), such as an Aluminum Nitride or Boron Nitride heater as or instead of the heating blocking. These heaters are capable of rapid heating (e.g., >300° C. per second) and can reach temperatures for flash evaporation (e.g., up to 1300° C.) in 1-2 seconds. With an intermittently actuated high-density heater, a desired volume of liquid can be delivered through the capillary to the heater's evaporation surface, where the liquid is flash evaporated by being heated for 3-5 seconds. The carrier gas sweeps the resulting pulse of vaporized analyte into the MRR instrument's sample chamber via the MRR nozzle 1006 for analysis. After a suitable delay to allow heating surface to cool down, the process can be repeated for another measurement. The liquid volume and enclosure size can be selected to maintain neon carrier gas concentration above 75%.

Figure 4:
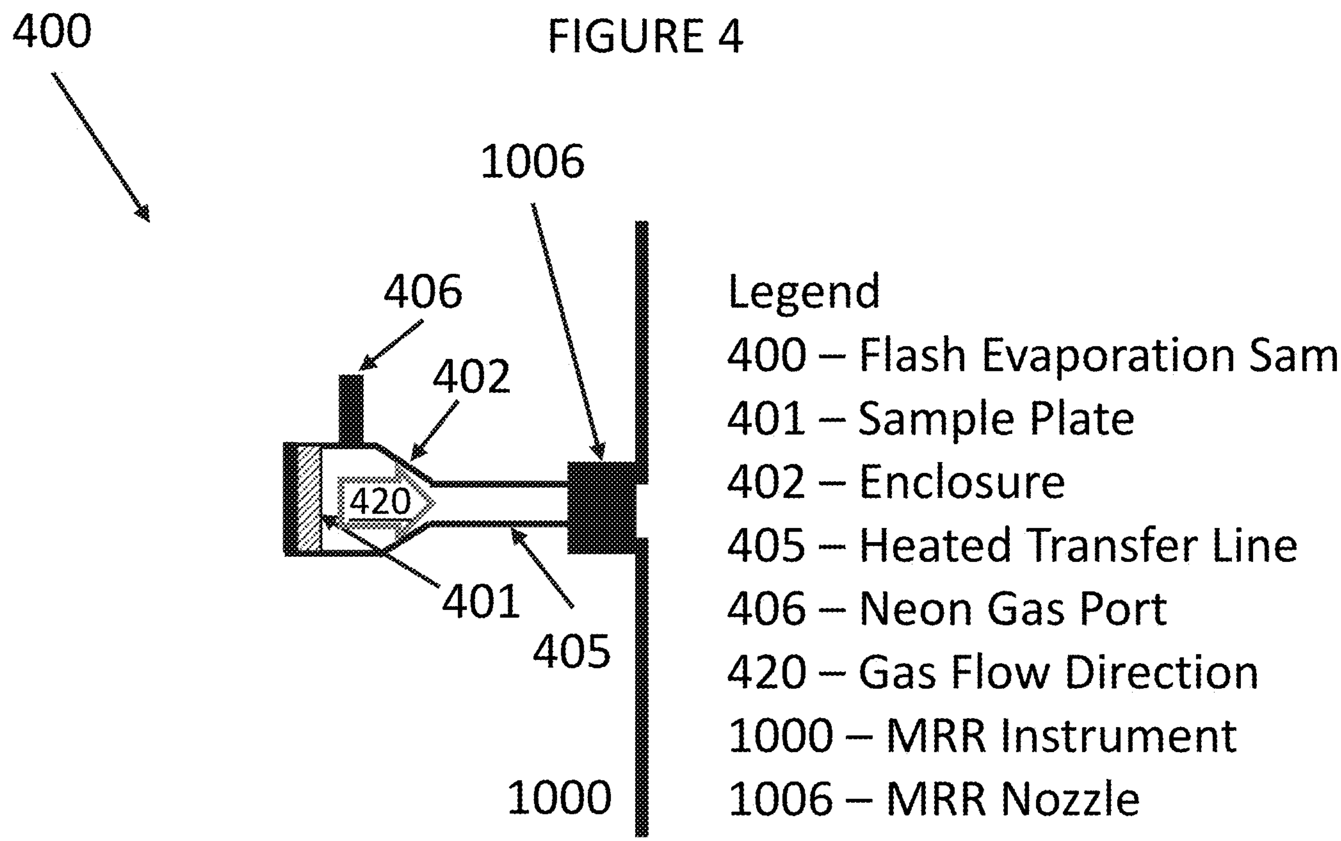
FIG. 4 shows another flash evaporation sampling interface for volatilizing solid samples.

FIG. 4 shows a flash evaporation sampling interface 400 that can vaporize solid samples for an MRR instrument 1000. It includes a sample plate 401 integrating one or multiple evaporation or heating surfaces. An appropriate amount of sample is deposited onto the heating surface, either as a solid or as a liquid solution that is allowed to dry, removing the solvent. The sample plate 401 is then attached to the enclosure 402, which is connected to the MRR instrument nozzle 1006. The enclosure 402 and MRR instrument nozzle 403 may be connected by a heated transfer line 405 to allow easier attachment to the MRR instrument 1000. The heater or heater array can use a high-density heater (e.g., 100-300 W $cm^{-2}$) for rapid vaporization. The sample can be vaporized with a short (e.g., 3-5 s) heat pulse and mixed with the carrier gas entering the enclosure 402 through a gas port 406. In operation, the MRR instrument nozzle 1006 creates a gas flow 420 in a direction that drives the resulting gas mixture into the MRR instrument 1000 for MRR measurements. The mass of the sample vaporized in a single pulse and the volume of the enclosure can be selected to maintain the carrier gas concentration above 75%.

Pneumatic or Ultrasonic Nebulization

Nebulization is a process in which a liquid analyte or analyte solution is transformed from a bulk liquid into a fine spray or mist of small droplets (e.g., 1 μL to 10 μL droplets). This greatly increases the surface area available for vaporization and speeds up the vaporization process. Nebulization can be achieved several ways, including pneumatic (gas-assisted) nebulization, ultrasonic nebulization, and electrical nebulization. Electrical nebulization typically ionizes the sample and so is unsuitable for MRR applications.

A nebulizer is a device that converts liquids into a fine mist or spray (again, of 1 μL to 10 μL droplets). This mist can be swept into a heated transfer tube to facilitate solvent evaporation and prevent analyte condensation on the walls of the tube. A nebulizer may be coupled to an MRR instrument as a sampling interface. When coupled with an MRR instrument, the nebulizer may have specific parameters, such as low solution flow rates (e.g., nL $min^{-1}$ to μL $min^{-1}$); neutral electric charge in the droplets; small droplet sizes; and a high concentration of analyte in the sample, e.g., at least 100 mM to more than 500 mM. These parameters make the pneumatic and ultrasonic nebulization methods attractive for use with MRR.

Pneumatic nebulization occurs when gas at a higher pressure exits from a small hole (orifice) into gas at a lower pressure. This process forms a gas jet in the lower pressure zone and pushes the gas under lower pressure away from the orifice. The draw of the lower pressure gas at the orifice creates considerable suction, the extent of which depends on the differential pressures, the size of the orifice, and the shape of the orifice and surrounding apparatus. The suction near the orifice draws the liquid sample solution into the gas jet, breaking the liquid sample up into small droplets in the process. The sample tube is partially disposed in the pneumatic nozzle and the tip of the sample tube protrudes into the enclosure from the tip of the pneumatic nozzle.

Figure 5:
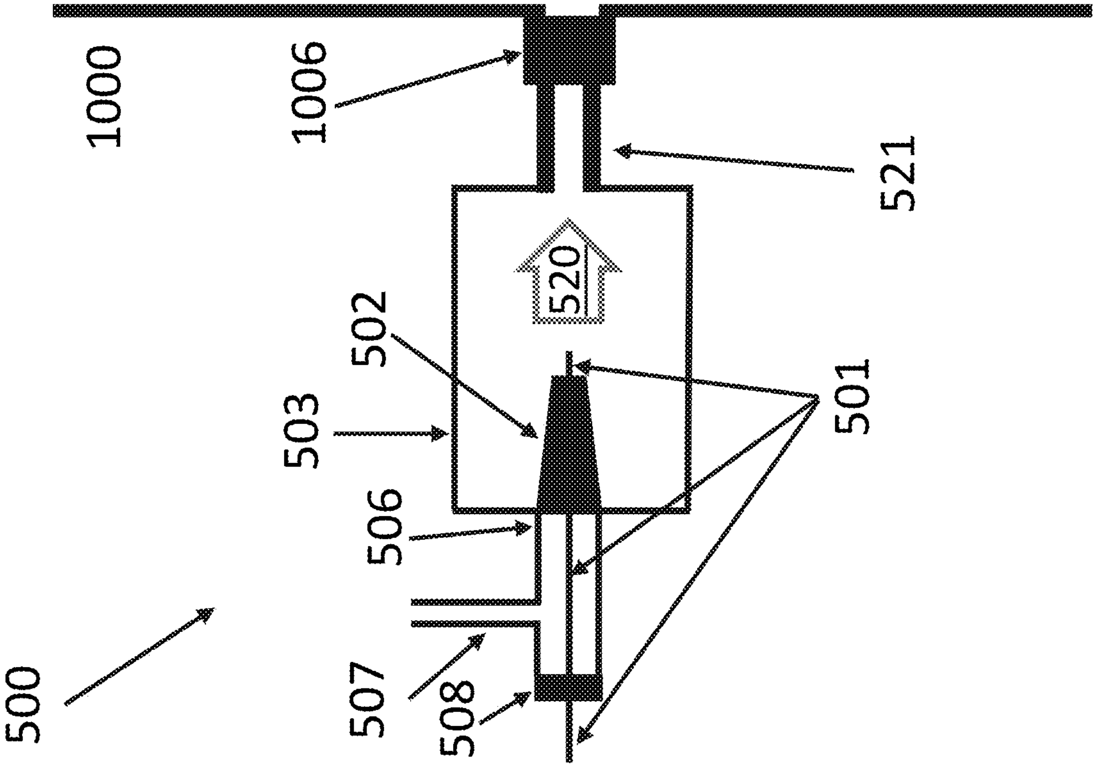
FIG. 5 shows a pneumatic nebulization source sampling apparatus.

FIG. 5 shows a pneumatic nebulization sampling interface 500. The pneumatic nebulization sampling interface 500 includes a sample capillary tube 501 providing a sample to the tip of a pneumatic nozzle 502 inside of an enclosure 503. One side of the enclosure 503 may be seated against the MRR instrument 1000 with an MRR nozzle 1006 fluidly coupling the enclosure 503 to the MRR instrument. The nebulizer 500 includes a nebulizer gas tee junction 506 coupled to a nebulizer gas inlet 507 and a gas-tight seal 508 around the sample capillary tube 501.

The pneumatic nebulizer sampling interface 500 is constructed with an inner liquid sample solution tube 501 and an outer gas tube 502. At the tip of the nebulizer 500, the gas tube 502 is shaped into a cone to create compression and generate high pressure gas. The nebulizer sampling interface 500 and gas can be heated to improve solvent and sample evaporation, typically to temperatures up to 500° C. The enclosure 503 may not have to be heated.

Figure 6:
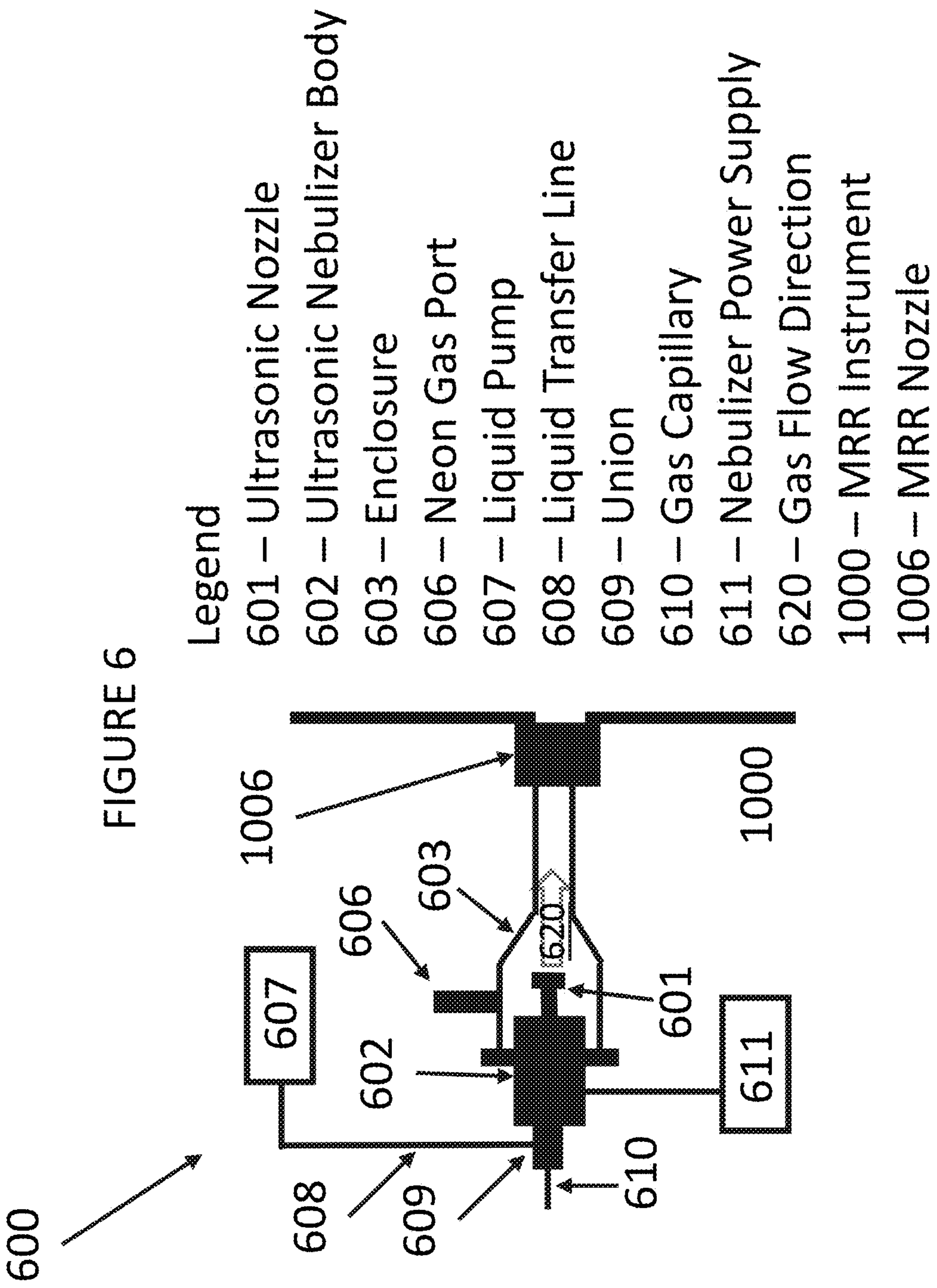
FIG. 6 shows an ultrasonic nebulization source sampling apparatus.
Figure 8:
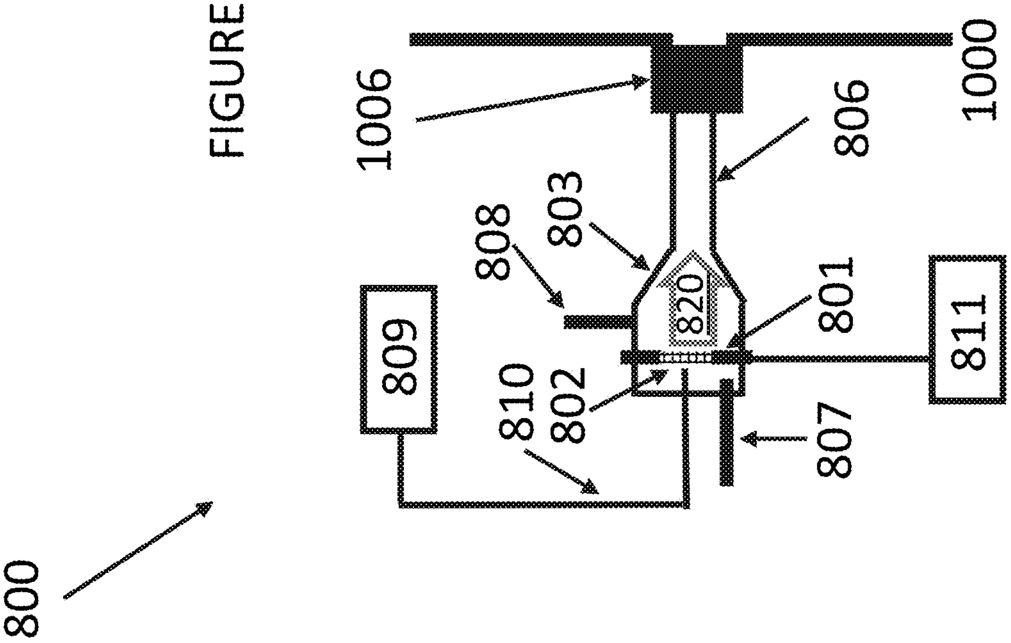
FIG. 8 shows another ultrasonic nebulization source sampling apparatus.

FIGS. 6 and 8 show two ultrasonic nebulization sampling interfaces 600 and 800, respectively. Ultrasonic nebulization can be achieved by coupling a sample delivery system with an ultrasonic device. A sample solution is delivered to the vibrating surface, which then vibrates the sample solution to produce a fine mist or spray. The frequency and amplitude of the vibrating surface may be set according to the surface tension and viscosity of the sample. Sample delivery can be achieved in a several different configurations. Dispersion of sample solution from the ultrasonic surface produces 1 μL to 10 μL droplets, facilitating solvent evaporation. The nozzle may direct droplets to the instrument interface using a directed flow of neon gas. The microchannels may be arranged in a parallel array to produce parallel streams of droplets. The microchannels may be arranged in an angled array to produce diverging streams of droplets. The ultrasonic nebulization system can be heated to temperatures up to about 500° C. to facilitate solvent evaporation and prevent analyte condensation.

In the ultrasonic nebulization sampling interface 600 shown in FIG. 6, an ultrasonic nozzle 601 containing a piezoelectric transducer is disposed on the ultrasonic nebulizer body 602. The device is contained within a pressure-tight enclosure 603 connected to the MRR instrument nozzle 1006 coupled to the MRR instrument 1000. Neon carrier gas flow is provided by a gas port 606. An analyte solution is delivered to the ultrasonic nozzle 601 by a liquid pump 607 connected to the sampling interface 600 through a liquid transfer line 608. Additionally, the liquid transfer line 608 can be combined through a union 609 with an internal gas capillary 610. A piezoelectric element inside the sampling interface 600 is powered by an external power supply 611, which may provide 0.5-5 W of power for operation at 120 kHz.

Figure 7:
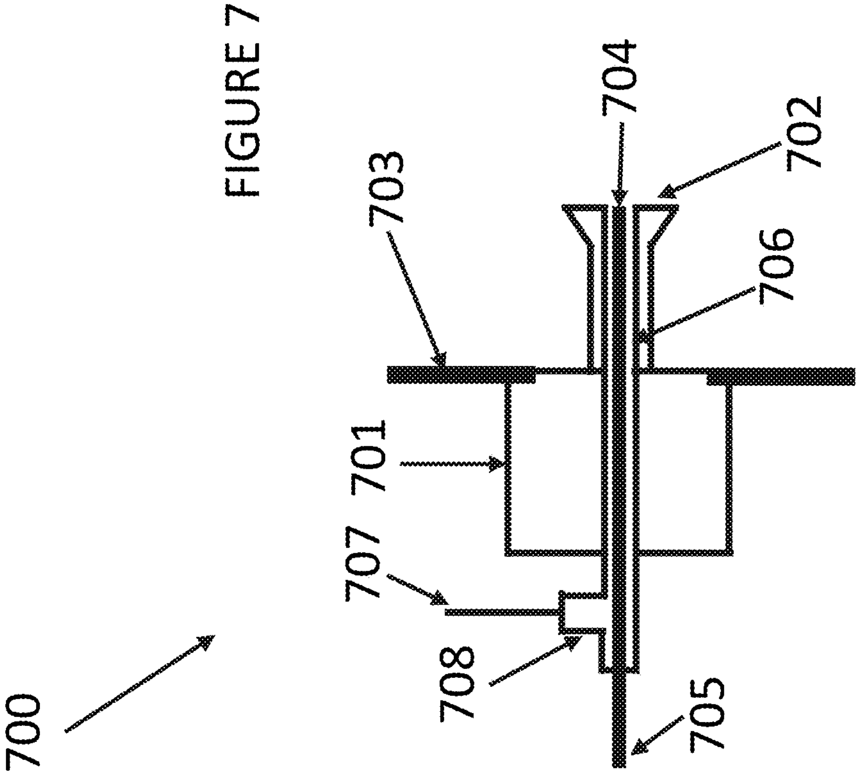
FIG. 7 shows a modified ultrasonic nebulizer for introducing liquid into the ultrasonic nebulizer sampling interface of FIG. 6.

FIG. 7 illustrates a modified ultrasonic nebulizer 700 for introducing liquid into the ultrasonic nebulizer sampling interface 600 shown in FIG. 6. An ultrasonic nebulizer body 701 contains an internal flow channel running through the center of the device 700, providing flow space to deliver liquid to the tip of an ultrasonic nozzle 702 (e.g., the ultrasonic nozzle 601 of FIG. 6). The device's body may contain a connecting flange 703 for easy coupling to the enclosure 603 of the ultrasonic nebulizer sampling interface 600. An internal gas capillary 704 with a gas inlet 705 on one end is installed into the center of the flow channel 706. The flow channel 706 is connected to the liquid inlet 707 through the union 708. The internal gas capillary 704 reduces the liquid surface area at the tip of the ultrasonic nozzle 702, while the flow of gas out of the capillary pushes the liquid exiting the flow channel onto the ultrasonic surface. Combining the gas and liquid flows allows the modified ultrasonic nebulizer 700 to operate with liquid flow rates below 1 μL $min^{-1}$ without analyte precipitation due to solvent evaporation, even for highly concentrated solutions.

FIG. 8 shows another ultrasonic nebulizer sampling interface 800. This ultrasonic nebulizer sampling interface 800 includes an ultrasonic device 801 that includes an ultrasonic mesh surface 802 at its center. The ultrasonic device 801 is disposed within a pressure-tight enclosure 803, which is connected to the MRR instrument nozzle 1006 and the MRR instrument 1000 through a heated transfer line 806. A carrier gas flow is provided by a primary gas port 807 located on the rear side of the ultrasonic device 801, forcing the carrier gas through the mesh surface 802. If the diameter and density of the mesh surface 802 restrict the carrier gas flow too much for efficient instrument operation, additional carrier gas flow may be provided through an auxiliary gas inlet 808. Liquid analyte solution is injected through a liquid pump 809 using a liquid transfer line 810. The liquid transfer line 810 is positioned behind the mesh surface 802, close enough to effect a liquid junction, where liquid exiting the transfer line attaches to the surface of the mesh 802 without physical contact between the transfer line 810 and the mesh surface 802. Liquid deposited onto the back of the mesh surface 802 is pulled to the front side by capillary forces and nebulized by ultrasonic vibrations. The resulting droplet stream proceeds in the direction of gas flow 820 towards the MRR instrument 1000. The ultrasonic mesh surface 802 can vibrate at frequencies between 100 kHz and 2 MHz, creating droplets between 1 μL and 10 μL in volume.

In sampling interfaces that utilize liquid pump injection (e.g., as shown FIGS. 3, 5, 6 and 8), the liquid pump can be a simple pump device, such as a syringe or a peristaltic pump, or a more complex device, such as a liquid chromatographer or an autosampler. Each of these devices can be coupled to a sampling interface with liquid pump injection through a liquid transfer line.

Using Sampling Techniques in a Production Line

Any of the sampling techniques and interfaces described above may be paired with a production line for production line monitoring. Samples may be extracted from the production line intermittently. For example, a few pills or a vial of liquid could be collected from the production line. Solid samples may be dissolved in an appropriate solvent and placed in a labeled (e.g., bar-coded) sample vial. The sample vial can be placed into an automated processing system (e.g., a PAL3 autosampler) that is fluidly coupled with the sampling interface and MRR instrument.

The automated processing system may prepare the sample for the sampling interface. If the sampling interface is a LIAD interface, the process may be semi-continuous, where the automated processing system prepares one or a series of solid samples on metal foil and transfers them into the LIAD enclosure sequentially, where the samples are volatilized and transferred into the MRR instrument for analysis. In the case that the samples are in a solution, the automated processing system may deposit the solution onto the metal foils and dry the samples to create solid samples. While analysis is conducted, the automated processing system may prepare another series of samples. If the sampling interface is a flash vaporizer or nebulizer, the automated processing system provides a liquid sample to the sampling interface, where the sample is volatilized and transferred into the MRR instrument for analysis. Sample vial labelling (e.g., barcode information) may be used to track the sample through the process and may be associated with results from the MRR instrument.

MRR instrument sensitivity benefits from increased analyte concentration in the instrument, but only up to a point. When analyte concentration in the instrument exceeds 0.5%, analyte free molecules start to aggregate and form molecular clusters that have different rotational spectra than individual free analyte molecules. The clustering reduces free analyte signal intensity and reduces instrument sensitivity. When liquid solution of analyte is used, solvent molecules can similarly aggregate with analyte molecules, thus limiting the combined concentration of solvent and analyte to 0.5%. Typical analyte solubilities in solvents rarely exceed 10% and are often as low as 0.1%. Introducing analyte solution may limit the concentration of analyte to 0.05% (0.5% clustering limit×10% solubility) for highly soluble analytes and to 0.005% (0.5% clustering limit×0.1% solubility) for low solubility analytes.

This reduction in performance is undesirable, so it would be beneficial if solvent could be removed after vaporization, increasing the concentration of the analyte that is introduced into the MRR instrument without reaching the clustering concentration limit. Solvent removal could be achieved by passing a vaporized solvent/analyte mixture through an adsorbent column. While different adsorbents may be used in the column, most adsorbents are not suitable for MRR application because they are not selective enough and don't work well at the high temperatures used for analyte vaporization (>200° C.).

Molecular sieves are a family of zeolite (alumino-silicate) compounds that form porous structures whose pore sizes can be varied by changing their chemical compositions. For example, a zeolite form incorporating potassium ions has 3 Å pore size, whereas a zeolite form incorporating sodium ions has a 4 Å pore size. Molecular sieves are commonly used to remove undesirable molecules, especially water. For example, they are commonly used for natural gas stream purification, removing water in ethanol process streams and sewage purification. Molecular sieves are particularly suitable for removing solvent from vaporized analyte, due to high degree of selectivity based on pore size and ability to function at high temperatures (e.g., up to 300° C.).

Molecular sieves contain pores similar in size to small molecules. Molecules smaller than the pore size enter the molecular sieve and are absorbed, while molecules larger than the pore size cannot the molecular sieve and thus are not absorbed. Typically, solvent molecules are much smaller than the analytes, and so passing a vaporized solvent/analyte mixture through a molecular sieve column with an appropriate pore size would selectively remove solvent molecules, while leaving analyte molecules in the gas stream proceeding to the instrument. For example, a molecular sieve with 3 Å pores can selectively remove water, leaving other molecules untouched, including even small solvents like methanol or ethanol. A molecular sieve with a 4 Å pore size removes water, methanol, and ethanol, but leaves larger analytes and solvents untouched (for example propanol or butanol). A molecular sieve with a 5 Å pore size can remove a broader range of solvents, including propanol and butanol.

Figure 9:
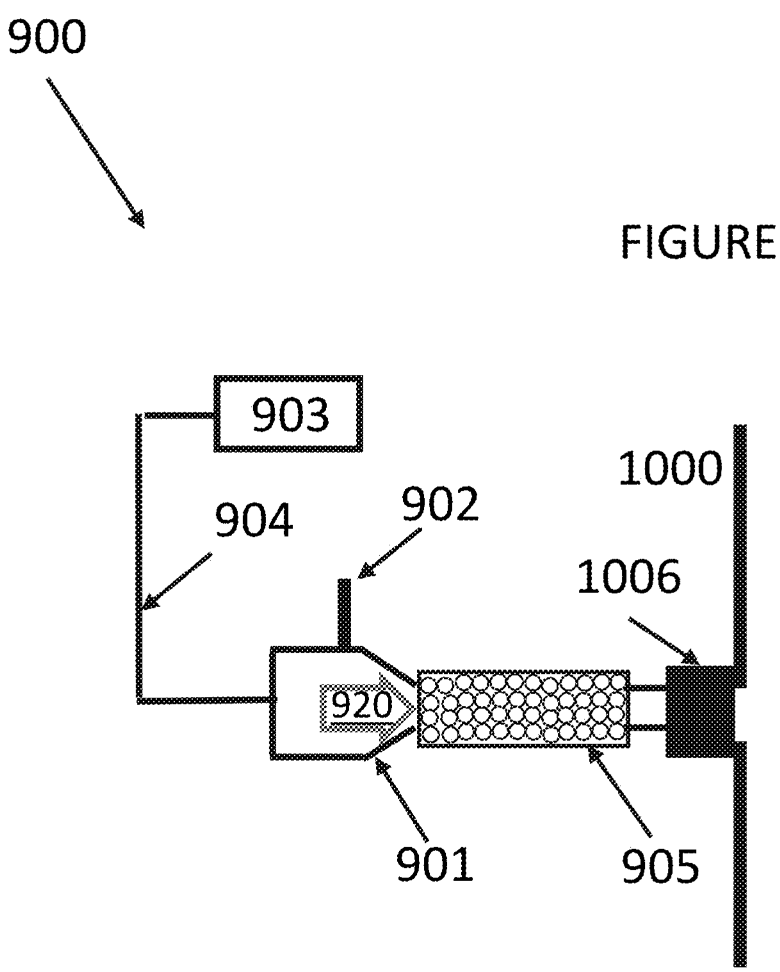
FIG. 9 shows a molecular sieve between a sampling interface and an MRR instrument nozzle for removing solvent from vaporized analyte.

FIG. 9 shows a molecular sieve used in an adsorbent implementation for an MRR system 900. The system 900 includes a vaporization system 901 (e.g., a LIAD, flash evaporation, or nebulizing sampling interface like those described above) with a carrier gas inlet 902. Analyte solution is injected by a liquid pump 903 through a liquid transfer line 904. A vaporized mixture of analyte and solvent in carrier gas from the vaporization system 901 passes through a heated molecular sieve column 905, on the MRR instrument nozzle 1006, which is coupled to the MRR instrument 1000. Although heating may reduce the capture efficiency of the molecular sieve column 905, it prevents analyte condensation. The molecular sieve column 905 can be heated to the analyte melting point and is inserted between the sample vaporization module 901 and the MRR instrument nozzle 1006. The molecular sieve column 905 is sized depending on the intended operating time and the liquid flow rate. For example, a column containing 100 g of 3 A molecular sieve allows efficient removal of water (>90%) over 200 minutes of operation at a liquid flow rate of 1 $\mu L\ min^{-1}$ while heated to 250° C. The molecular sieve column 905 can be regenerated by increasing the temperature to 350° C. and reducing the pressure using the MRR instrument's vacuum pump before resuming MRR measurements.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term “or” as used herein shall only be interpreted as indicating exclusive alternatives (i.e., “one or the other but not both”) when preceded by terms of exclusivity, such as “either,” “one of,” “only one of,” or “exactly one of” “Consisting essentially of,” when used in the claims, shall have its ordinary meaning as used in the field of patent law.

As used herein in the specification and in the claims, the phrase “at least one,” in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase “at least one” refers, whether related or unrelated to those elements specifically identified. Thus, as a non-limiting example, “at least one of A and B” (or, equivalently, “at least one of A or B,” or, equivalently “at least one of A and/or B”) can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as “comprising,” “including,” “carrying,” “having,” “containing,” “involving,” “holding,” “composed of,” and the like are to be understood to be open-ended, i.e., to mean including but not limited to. Only the transitional phrases “consisting of” and “consisting essentially of” shall be closed or semi-closed transitional phrases, respectively, as set forth in the United States Patent Office Manual of Patent Examining Procedures, Section 2111.03.

The invention claimed is:

1. A sampling interface for a molecular rotational resonance (MRR) spectrometer, the sampling interface comprising:
- an enclosure;
- a nebulizer, coupled to the enclosure, to produce a fine mist of a liquid solution of an analyte and a solvent in the enclosure, the fine mist comprising droplets having volumes of about 1 μL to about 10 μL, thereby accelerating evaporation of the solvent from the liquid solution; and
- a nozzle, in fluid communication with the enclosure, to inject the analyte into a sample chamber of the MRR spectrometer.

2. The sampling interface of claim 1, wherein the nebulizer is a pneumatic nebulizer comprising:
- a pneumatic nozzle having a first orifice with a first diameter, a second orifice with a second diameter greater than the first diameter, and a lumen connecting the first orifice and the second orifice, the first orifice being disposed within the enclosure; and
- a carrier gas port, coupled to the second orifice of the pneumatic nozzle, to introduce a carrier gas into the enclosure via the pneumatic nozzle.

3. The sampling interface of claim 1, wherein the nebulizer is an ultrasonic nebulizer comprising:
- a vibrating device; and
- a flow channel, partially disposed within the vibrating device, to convey the liquid solution to a surface of the vibrating device.

4. The sampling interface of claim 3, wherein the vibrating device is a piezoelectric transducer.

5. The sampling interface of claim 1, wherein the nebulizer is an ultrasonic nebulizer comprising:
- a vibrating device having a surface disposed within the enclosure; and
- a tube to convey the liquid solution to the surface of the vibrating device.

6. The sampling interface of claim 5, wherein the vibrating device is a piezoelectric transducer.

7. The sampling interface of claim 1, wherein the enclosure is maintained at a pressure of about 3 bar to about 15 bar.

8. The sampling interface of claim 1, wherein the enclosure comprises a mixture of gases and at least 75% of the mixture of gases is a carrier gas.

9. The sampling interface of claim 1, wherein the analyte has a molecular weight greater than 100 Daltons and/or a boiling point greater than 100° C.

10. The sampling interface of claim 1, wherein the sampling interface is configured to be heated to evaporate the solvent from the fine mist.

11. The sampling interface of claim 1, wherein the nebulizer comprises a liquid inlet configured to supply the liquid solution.

12. The sampling interface of claim 1, further comprising:
- a heated transfer line, connecting the nebulizer to the nozzle, to evaporate the solvent from the fine mist.

13. A method of introducing a liquid analyte into a molecular rotational resonance (MRR) spectrometer, the method comprising:
- nebulizing a liquid solution of analyte and solvent to produce a fine mist;
- evaporating the solvent from the fine mist; and
- injecting the analyte into a sample chamber of the MRR spectrometer.

14. The method of claim 13, wherein evaporating the solvent from the fine mist comprises heating the fine mist.

15. A sampling interface for a molecular rotational resonance (MRR) spectrometer, the sampling interface comprising:
- an enclosure;
- a metal foil disposed within the enclosure and having a first surface to support an analyte deposited on the first surface at a concentration of no more than 30 μg $mm^{-2}$;
- a laser, in optical communication with a second surface of the metal foil opposite the first surface, to illuminate the second surface of the metal foil with a laser beam, the laser beam producing an acoustic wave in the metal foil that causes desorption of the analyte from the first surface of the metal foil;
- a carrier gas port, coupled to the enclosure, to flow a carrier gas into the enclosure; and
- a nozzle, coupled to the enclosure, to inject the analyte and the carrier gas into a sample chamber of the MRR spectrometer.

16. The sampling interface of claim 15, wherein the enclosure is configured to maintain at a pressure of about 3 bar to about 15 bar.

17. The sampling interface of claim 15, wherein the enclosure is configured to comprise a mixture of gases and at least 75% of the mixture of gases is the carrier gas.

18. The sampling interface of claim 15, wherein the analyte is neutral.

19. The sampling interface of claim 15, wherein the analyte is a crystalline analyte deposited at a concentration of less than 5 μg $mm^{-2}$.

20. The sampling interface of claim 15, wherein the analyte is a powdered analyte deposited at a concentration of 5 μg $mm^{-2}$ to 30 μg $mm^{-2}$.

* * * * *